(12) United States Patent
Topolcic et al.

(10) Patent No.: US 8,484,291 B1
(45) Date of Patent: Jul. 9, 2013

(54) METHOD AND APPARATUS FOR SELECTING COMMANDS FOR TRANSMISSION FROM AN UPDATED QUEUE

(75) Inventors: Claudio Topolcic, Concord, MA (US);
Debby Mendez, Arlington, MA (US);
Ed Hardebeck, Brookline, MA (US);
Richard L. Baker, Belmont, MA (US)

(73) Assignee: Glance Networks, Inc., Arlington, MA (US)

( * ) Notice: Subject to any disclaimer, the term of this patent is extended or adjusted under 35 U.S.C. 154(b) by 814 days.

(21) Appl. No.: 12/061,011

(22) Filed: Apr. 2, 2008

(51) Int. Cl.
*G06F 15/16* (2006.01)

(52) U.S. Cl.
USPC .............................. 709/205; 709/207; 709/208

(58) Field of Classification Search
None
See application file for complete search history.

(56) References Cited

U.S. PATENT DOCUMENTS

| | | | |
|---|---|---|---|
| 5,107,443 A | 4/1992 | Smith et al. |
| 5,220,657 A | 6/1993 | Bly et al. |
| 5,673,252 A | 9/1997 | Johnson et al. |
| 6,225,922 B1 | 5/2001 | Norton |
| 6,329,984 B1 | 12/2001 | Boss et al. |
| 6,339,803 B1 | 1/2002 | Glassen et al. |
| 6,363,075 B1 | 3/2002 | Huang et al. |
| 6,819,271 B2 | 11/2004 | Geiger |
| 6,859,928 B2 | 2/2005 | Wright |
| 6,950,852 B1 | 9/2005 | Kobayaghi et al. |
| 6,963,946 B1 | 11/2005 | Dwork |
| 6,986,147 B2 | 1/2006 | Gooding |
| 7,043,559 B2 | 5/2006 | Boskovic et al. |
| 7,133,362 B2 | 11/2006 | Chu et al. |
| 7,154,621 B2 | 12/2006 | Rodriguez et al. |
| 7,177,918 B2 | 2/2007 | Joshi et al. |
| 7,206,811 B2 | 4/2007 | Skurikhin et al. |
| 7,219,127 B2 | 5/2007 | Huck et al. |
| 7,222,305 B2 * | 5/2007 | Teplov et al. ................. 715/751 |
| 7,283,154 B2 | 10/2007 | Shachar et al. |
| 7,584,243 B2 * | 9/2009 | Fujiki et al. ................... 709/203 |

(Continued)

FOREIGN PATENT DOCUMENTS

| EP | 0 721 266 A2 | 7/1996 |
| EP | 1 320 241 A2 | 6/2003 |

(Continued)

OTHER PUBLICATIONS

U.S. Appl. No. 11/355,740, filed Feb. 16, 2006, Hardeback et al.

*Primary Examiner* — Firmin Backer
*Assistant Examiner* — Keyvan Emdadi
(74) *Attorney, Agent, or Firm* — Anderson Gorecki & Rouille, LLP (57) ABSTRACT

Commands associated with an update allow a presenter display to be recreated by a viewer. The commands are delineated by end of update markers. Commands are transmitted to viewers in viewer updates to allow viewers to see information that was shown on the presenter display as it existed at a particular point in time. A target end of update marker will be selected for a viewer update and all commands necessary to recreate the presenter display at that point in time will be transmitted to the viewer. Since the target end of update marker may cause several presenter updates to be included in a given viewer update, some of the commands in the update queue may not need to be transmitted to the viewer. Prunability indicators are therefore added to commands to allow commands to be selected for transmission to a viewer based on the target end of update marker.

15 Claims, 4 Drawing Sheets

U.S. PATENT DOCUMENTS

| | | |
|---|---|---|
| 2001/0034770 A1 | 10/2001 | O'Brien |
| 2003/0065722 A1 | 4/2003 | Ieperen |
| 2004/0122971 A1 | 6/2004 | Joshi et al. |
| 2004/0181579 A1* | 9/2004 | Huck et al. .................... 709/205 |
| 2004/0181796 A1 | 9/2004 | Fedotov et al. |
| 2005/0102321 A1 | 5/2005 | David et al. |
| 2005/0204047 A1 | 9/2005 | Mitchell et al. |
| 2006/0129634 A1 | 6/2006 | Khouzam et al. |
| 2006/0181579 A1 | 8/2006 | Taira |
| 2006/0184614 A1 | 8/2006 | Baratto et al. |
| 2006/0203007 A1 | 9/2006 | Bullard et al. |
| 2007/0083596 A1 | 4/2007 | Ludwig et al. |
| 2007/0088781 A1 | 4/2007 | Ludwig et al. |
| 2007/0088782 A1 | 4/2007 | Ludwig et al. |
| 2007/0168426 A1 | 7/2007 | Ludwig et al. |
| 2007/0198534 A1 | 8/2007 | Hon et al. |
| 2009/0013045 A1* | 1/2009 | Maes et al. .................... 709/205 |

FOREIGN PATENT DOCUMENTS

| | | |
|---|---|---|
| JP | 8321889 | 12/1996 |
| WO | WO 80/01421 | 7/1980 |
| WO | WO 99/46702 | 9/1999 |
| WO | WO 01/92973 A2 | 12/2001 |
| WO | WO 2008/119149 A1 | 10/2008 |

* cited by examiner

METHOD AND APPARATUS FOR SELECTING COMMANDS FOR TRANSMISSION FROM AN UPDATED QUEUE

CROSS REFERENCE TO RELATED APPLICATIONS

This application is related to U.S. patent application Ser. No. 11/355,740, filed Feb. 16, 2006, entitled Method And Apparatus For The Transmission Of Changed Host Display Information, U.S. patent application Ser. No. 11/355,852, filed Feb. 16, 2006, entitled Method and Apparatus for the Identification and Selective Encoding of Changed Host Display Information, and to U.S. patent application Ser. No. 11/355,741, filed Feb. 16, 2006, entitled Method and Apparatus for the Transmission of Changed Host Display Information, the content of each of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

1. Field

The field relates to visual information systems and, more particularly, to a method and apparatus for selecting commands for transmission from an update queue.

2. Description of the Related Art

Telephones enable people to communicate verbally, but do not enable people to exchange visual information with each other. Conventionally, when visual information such as a PowerPoint (™ Microsoft Corporation) presentation or a document was to be referenced during a telephone call, the visual information would be faxed, e-mailed, or otherwise physically sent to the participants so that the participants could have the reference materials available during the telephone call.

As technology evolved, software was developed to allow information being shown on a presenter's display (presenter display information), such as a computer monitor screen, to be made visible on another display at a different location. Software of this nature will be referred to herein as "Remote Viewing Software" (RVS).

Figure 1:
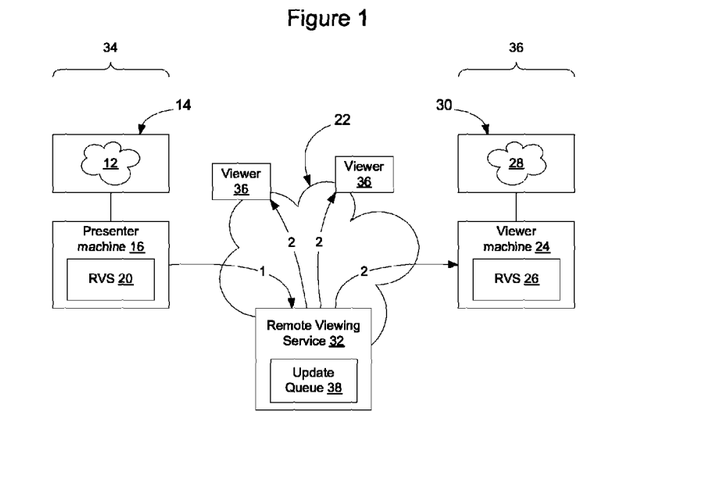
FIG. 1 is a functional block diagram illustrating the participants to a remote viewing session.

FIG. 1 illustrates an example of a way in which remote viewing of presenter display information may take place. As shown in FIG. 1, it may be desirable to allow presenter display information 12 appearing on a presenter display 14 associated with a presenter machine 16, to be made available to one or more viewers remotely. To do so, RVS software 20 on the presenter machine 16 will capture the presenter display information 12 and pass it over a network 22 to a viewer machine 24. An instantiation of the RVS software 26 (which may be the same as RVS software 20 or a limited version of RVS software 20) will decode the received presenter display information 28 that will be caused to appear on the viewer display 30. A remote viewing service 32 may be provided to support viewing sessions on the network. A combination of the presenter machine 16 and presenter display 14 will collectively be referred to herein as a "presenter" 34. The presenter machine and presenter display may be separate devices or integrally formed. Similarly, a combination of a viewer machine and viewer display will collectively be referred to herein as a "viewer" 36. The viewer machine and viewer display may be separate devices or integrally formed.

By causing the viewer display information 28 on the viewer display 30 to replicate the presenter display information 12 on the presenter display 14, both the presenter and viewer may see the same display information. Of course, due to processing and transmission delays, the information provided on the viewer's display may lag the information being shown on the presenter's display somewhat. A remote viewing session over which the presenter display information is transmitted may be hosted by the presenter machine 16, or the remote viewing service 32 may assume a portion of the tasks required to presenter the session.

When the system of FIG. 1 is in use, a desired visual presentation may be caused to appear on the viewer display 30 simply by causing the desired visual presentation to appear as part of the presenter display information shown on the presenter display. Reference may then be made to the shared presenter display information to enable more effective communication to take place between the presenter participant and viewer participants.

Since transmission of presenter display information may require transmission of a significant amount of data, RVS software 20 may encode the presenter display information for transmission over the network 22. The RVS software 26 will then decode the received information for display on the viewer display 30.

The remote viewing service 32 may be particularly useful in a situation where more than one viewer would like to view the presenter display information 12. In this instance, the presenter may transmit presenter updates to the presenter display information to the remote viewing service 32, and the remote viewing service 32 may then transmit the information as viewer updates to each of the viewers. Since different viewers may have different abilities to receive information, for example where the network conditions or machine capabilities limit a receiver's ability to receive updates, it is desirable to allow the remote viewing service to transmit information to the several viewers at different rates. However, to minimize the memory requirements at the service 32, it is advantageous to allow the remote viewing service to use only one or a limited number of queues for each session.

SUMMARY

Presenter display information may be captured, selectively encoded, and transmitted to viewers over a session directly or in connection with a remote viewing service. To reduce the amount of information that must be transmitted on a given session, only portions of the presenter display information that have changed are selected to be transmitted from the presenter to the viewers. Portions that are unchanged are not transmitted, as it may be assumed that the viewers are in possession of the non-changed information due to previous transmissions. Commands associated with a particular view of the presenter display information are processed and transmitted by the presenter as a presenter update. The commands are stored in a queue for transmission to the viewers. To enable commands that were generated in connection with different views of the presenter's display to be identifiable within the queue, an end of update marker is transmitted by the presenter to signify the end of a presenter update. To generate a viewer update, an end of update marker will be selected for the viewer update and all required commands up to the end of update marker will be transmitted to the viewer as the viewer update.

Viewers may have different network and processing capabilities which may affect the rate at which they are able to receive information. To accommodate different viewer capabilities, the commands stored in the update queue may be transmitted to viewers according to the viewers' abilities to receive them. In one embodiment, each command is assigned a unique sequence number. As commands arrive that supersede older commands, the new commands may cause the old commands to be marked as prunable relative to a later-arrived command.

When a viewer requests a viewer update, a target end of update marker is selected and all commands in the queue (from the viewer's current location in the queue to the end of update marker) that have not been marked as prunable by a command having a sequence number lower than or equal to the sequence number of the target end of update marker are transmitted to the viewer. By transmitting all required commands up to the end of update marker, the viewer may be presented with an updated view of the presenter's display at a particular point in time. By marking commands as prunable, rather than deleting prunable commands from the queue, the commands may be selectively transmitted to viewers depending on the target end of update marker selected for viewer updates for those viewers. By selecting different end of update markers, different viewers may obtain updated views of the presenter's display according to their abilities, with particular commands being pruned relative to that target view associated with the target end of update marker.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

U.S. patent application Ser. No. 11/355,740, filed Feb. 16, 2006, entitled Method And Apparatus For The Transmission Of Changed Presenter Display Information, contains a detailed description of several aspects of a system that may be used in connection with an embodiment of the invention. The detailed description of that system is hereby incorporated herein by reference. Other embodiments of the invention may be used with other systems where a queue of information is maintained to be transmitted to a viewer, and where later received parcels of information may obsolete earlier received parcels of information. Accordingly, although an embodiment will be described that is configured to work with the system described in U.S. patent application Ser. No. 11/355, 740, the invention is not limited to use with that particular system.

FIG. 1 shows an example network in which a remote viewing service 32 is provided to implement sessions between a presenter 34 and viewer 36. As shown in FIG. 1, the remote viewing service 32 maintains an update queue 38 containing commands received from the presenter that are to be transmitted to viewers. Maintaining an update queue allows the remote viewing service 32 to transmit updates to viewers as requested by the viewers so that different viewers may receive updates at different times.

Where multiple sessions are being handled by the remote viewing service 32 for different presenters and sets of viewers, the remote viewing service 32 may implement a separate queue for each session. For simplicity the following explanation will focus on how the remote viewing service may implement a session between a presenter and a set of viewers. This process may be replicated to allow the remote viewing service to implement many such sessions for different sets of presenters/viewers simultaneously.

Figure 2:
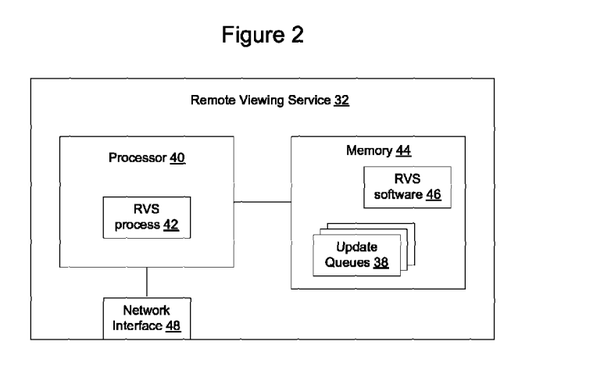
FIG. 2 is a functional block diagram of an example remote viewing service according to an embodiment of the invention.

FIG. 2 is a functional block diagram of an example remote viewing service according to an embodiment of the invention. As shown in FIG. 2, the remote viewing service 32 may be implemented on a server having one or more processors 40 containing logic that will enable the processor to presenter one or more RVS processes 42. Data and instructions for the RVS processes may be stored in memory 44 as RVS software 46. The RVS software 46 (and process 42) enables the remote viewing service to implement one or more update queues 34 that will allow commands received from a presenter to be selectively transmitted to viewers. The RVS 32 may handle multiple sessions for different sets of presenters/viewers, as noted above, each with its own update queue.

In the following description it will be assumed that the presenter is generating presenter updates to be transmitted to the viewers. Presenter updates may be generated by comparing a new version of the information 12 displayed on the presenter display 14 with an earlier version of the information 12, and then transmitting commands that describe the changes to the service 32 or to the viewers 36. Where a service 32 is involved, the service 32 may store the commands in a queue 38 for subsequent transmission to the viewers.

In one embodiment, the presenter will compare sequential versions of the presenter display information 12 so that a set of commands describe the changes that have occurred to the presenter display information during a particular interval of time. Thus, if a viewer has received information to recreate the presenter's display information at an earlier point in time, a presenter update will allow the viewer to create that presenter's display information at the later point in time. Update commands may be paint commands, which contain pixel data for a particular area of the screen, copy commands which contain instructions to move a previous area of the screen to a new area, scale commands that instruct a portion of the previous screen to be changed to a new size, pointer commands that describe the coordinates of the pointer and optionally how the pointer should be moved to reach the new coordinates, and many other types of commands.

At a given point in time, the presenter RVS software will process the display image and determine what areas of the display have changed. Only the changed portions of the display will result in the generation of commands. The unchanged portions of the display will be assumed to already have been transmitted on the session and, thus, need not be re-transmitted. A series of commands describing the changes that have been made to the presenter display screen at a particular point in time will be referred to as an update. Thus, an update will contain those commands that are necessary to cause the remote viewer's screen to be changed such that the remote viewer's screen is able to show the presenter display information that was visible on the presenter's display at the point in time when the update was generated.

An end of update indicator will be transmitted by the presenter at the end of an update. The end of update indicator may be a separate command or may be contained in another command. An end of update marker will be added to the queue 38 to delineate commands within the queue as belonging to updates associated with the way the presenter's display appeared at different points in time. Thus, a set of updates in the queue between subsequent end of update markers are associated with a particular update and, hence, may be used to update the presenter's display from their previous view of the presenter's display to show the view of the presenter's display at the point in time where the update commands were generated.

The service 32 will maintain a pointer for each viewer indicating a position in the queue associated with that viewer. The pointer indicates that all of the required commands in the queue up to the location of the pointer have been transmitted to the viewer. To allow a viewer to receive a view of the presenter's display at a particular point in time, when a viewer requests a viewer update, a target end of update marker will be selected as a reference, and all commands necessary to recreate the presenter's display at that point in time will be transmitted to the viewer. The target end of update marker may be the next subsequent end of update marker in the queue or another end of update marker as discussed in greater detail below.

Those commands in the update queue that are necessary to create the viewer's display at the point in time associated with the target end of update marker will then be transmitted to the viewer. Since the target end of update marker may refer to any point in time between the viewer's current location in the queue and the presenter's location in the queue, updating a particular viewer to show the presenter's display as it appeared at the time associated with the target end of update marker may require the commands from more than one update to be transmitted to the viewer. As discussed in greater detail below, since commands from a subsequent update may supersede commands from one or more earlier updates, commands may be marked as prunable relative to later commands. The particular commands to be translated may be determined by looking at where the later commands fall in the update queue relative to the target end of update marker. In this manner only those commands necessary to recreate the presenter's display at a particular point in time are required to be transmitted to the viewer.

Figure 3:
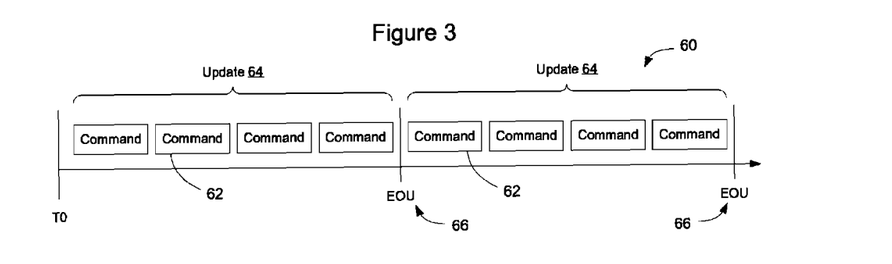
FIG. 3 is a timeline showing the receipt of updates and commands by a remote viewing service.

FIG. 3 illustrates an example of a timeline 60 showing commands being received over time. As described in the parent application, the presenter RVS software will take a snapshot of the presenter display information and generate an update 64 containing a group of commands 62 that may be used to describe the changes between the way the presenter display looks at that point in time and the way the presenter display looked at the point in time when the previous update was generated. Thus, each update contains a set of commands that describe the changes to the presenter's display since the previous update. Optionally, administrative commands such as pointer commands, guest information messages, and other commands, may be transmitted as well.

As discussed above, commands from one update may refer to the same area of the screen as commands from an earlier update. For example, a command may contain information to allow pixels in a particular area to be painted in a particular way. Subsequent commands that overwrite the area with a different image may make the earlier paint command superfluous. However, the earlier command may still be relevant to particular viewers, depending on which point in time (which target end of update marker) is selected for the viewer. Thus, the earlier commands should not be removed from the queue, but merely marked as prunable relative to the later command. If a viewer is to be updated such that the set of commands associated with the update encompass both the earlier and later command, the earlier command may be omitted from the set of commands transmitted to the viewer. Conversely, if the later command will not be transmitted to the viewer in connection with updating the viewer, the earlier command is still relevant and should be transmitted to the viewer. According to an embodiment of the invention, this is implemented by allowing commands to be marked as prunable relative to a later command, and selected commands for transmission depending on their position in the queue relative to the target end of update marker.

Figure 4:
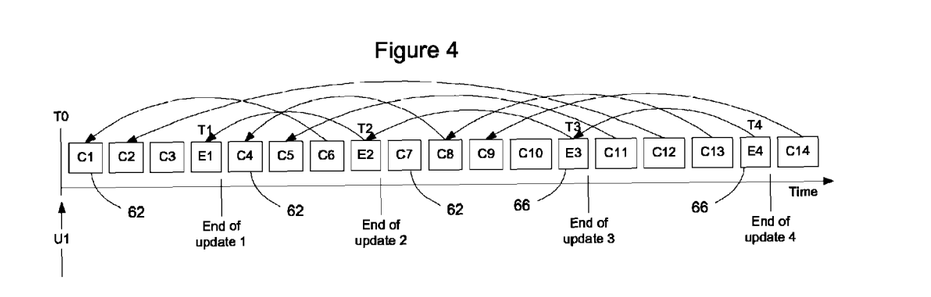
FIG. 4 is a timeline showing the receipt of updates and commands by a remote viewing service, and illustrating an example of how later received commands may render earlier commands prunable relative to a particular target end of update marker.

FIG. 4 illustrates how particular commands may supersede other commands. Specifically, assume that four updates have been received, each of which includes several commands, and which are delimited in FIG. 4 by end of update markers 66. For various reasons, some of the commands from newer updates may supersede some of the commands from older updates. This is illustrated in FIG. 4 by the arrows. For example, command C6 supersedes command C1, command C8 supersedes command C4, etc. As shown in FIG. 4, each command contains a sequence number that remains unique within the queue. Optionally the end of update markers may also be stored as a command within the queue and be sequentially numbered along with the other commands.

Different viewers may have different abilities, such that some viewers may be on a relatively fast network connection while other viewers may be on a relatively slow network connection. Similarly, the different end viewers machines may have differential ability to process information. One way to accommodate the differences between viewers network connections and processing abilities is to allow viewers to request and receive information at different rates. However, from a viewer standpoint, it is preferable for the viewer to receive a complete image of the presenter's display at a particular point in time, rather than continuing to have discrete points of the display updated on a continuous basis. Specifically, the updating process should occur such that a viewer is able to obtain snapshots of the presenter's display information as it appeared at some point in time so that, even if the viewer is somewhat behind the presenter, the viewer is still able to follow along albeit in a somewhat delayed fashion.

According to an embodiment of the invention, when a viewer requests the RVS service to transmit a new viewer update to allow the viewer to see a new iteration of the presenter's screen, the RVS service will select a target end of update marker. The target end of update marker determines which commands in the queue should be transmitted to the viewer for this particular update. The target end of update marker may be selected to correspond to the most recently received update from the presenter or may correspond to the way the presenter display looked at an intermediate point in time, depending on the manner in which the RVS service has been implemented for that viewer.

The RVS service maintains a pointer indicating which commands have been transmitted to the particular viewer. This is also referred to herein as the viewer's position in the queue. Thus, in the example shown in FIG. 4, it will be assumed that the viewer's pointer is pointing to location U1 such that all relevant commands received before that time have been transmitted to the viewer. When the RVS service receives a request for an update, the RVS service will select a target end of update marker for the viewer update. The RVS service will then start transmitting those commands in the command queue that are after the viewer's pointer U1 and which have not been determined to be prunable for the viewer update. A command will be deemed to be prunable for a viewer update if it is tagged with a prunability marker indicating that it is superseded by another command in the queue that has a sequence number lower than the target end of update marker. Stated differently, if a command is superseded by another command with a sequence number lower than the target end of update marker, the second command will be transmitted as part of the viewer update. Thus, the first command need not be transmitted and is, hence, prunable relative to the later command for that particular viewer update.

For example, assume that command C1 in the example shown in FIG. 4 is a paint command that relates to a particular area of the screen, and that command C6 is also a paint command that relates to the same area of the screen. If the target end of update marker is E1, command C1 is required to recreate the presenter's display at the time associated with E1 and, hence, is not prunable for that viewer update. However, if the target end of update marker is selected to be E2, the objective of the update process is to recreate the presenter's display as it existed at the time associated with E2. In this instance, the first command (C1) is not required since the same area of the screen will be overwritten by a subsequent command (C6). Accordingly, C1 may be deemed prunable and not transmitted if the target end of update marker for the update is selected to be E2 or higher. By marking the update as "prunable" it is possible to determine whether a particular command should be transmitted in connection with a particular viewer update depending on the target end of update marker associated with the viewer update. The command is not automatically removed from the update queue, however, since the command may be relevant for viewers seeking to receive a viewer update with other target end of update markers.

FIG. 4 shows a timeline of the arrival of commands and shows an example in which some of the later commands supersede other earlier commands. In the example of FIG. 4, command C6 associated with update 2 has overwritten command C1, command C12 associated with update 4 has overwritten command C2 of update 1, etc. The arrows show which commands supersede other commands in this example. Assume now that a viewer is being updated with a target end of update marker=E2, and that the viewer's current position in the queue is at time T0 (arrow U1). Command C1 is obsoleted by command C6, and command C6 will be transmitted to the viewer as part of this update since the target end of update marker is E2. Thus, command C1 need not be transmitted to the viewer. Command C2, by contrast, is not overwritten until the update associated with update 4. Thus, command C2 is required to generate a complete image at time T2 associated with end of update marker E2. Accordingly, command C2 will be transmitted to the viewer. Command C3 is not overwritten by a subsequent command and thus will also be transmitted. Commands C4, C5, and C6 are also necessary to paint a complete display for the viewer at the time T2, and hence will be transmitted to the viewer.

Similarly, assume now that the target end of update marker is E 4. In this instance, the RVS service will attempt to replicate the content of the presenter display as it appeared at a point in time associated with end of update marker E4. Thus, all of those changes that were made to the display between the viewer's current location in the queue (arrow U1) and the end of update 4 must be transmitted to the viewer. Thus, the commands that formed updates 1, 2, 3, and 4, should all be transmitted to the viewer. However, where multiple updates contained commands related to the same area of the screen or which otherwise make earlier commands obsolete, only the most recent command should be transmitted to the viewer. In the example shown in FIG. 4, commands C1, C2, C4, C5, and C8 are all made obsolete by subsequent updates where the target end of update marker is E4. Thus, commands C3, C6-C7, C9-C13 should all be transmitted to the viewer in connection a viewer update where the target end of update marker is E4. Although command C9 was overwritten by command C14, command C14 is from an update that was received from the presenter and associated with the way in which the presenter's display appeared at a later point in time. Thus, command C9 is still required to be transmitted in connection with this particular update since command C9 is relevant to the way the presenter's display appeared at the point in time associated with the target end of update marker for this update. Thus, since command C14 will not be transmitted in connection with this update (because it occurs after the reference point in time associated with the target end of update marker) command C9 is not deemed prunable in connection with this update.

Figure 5:
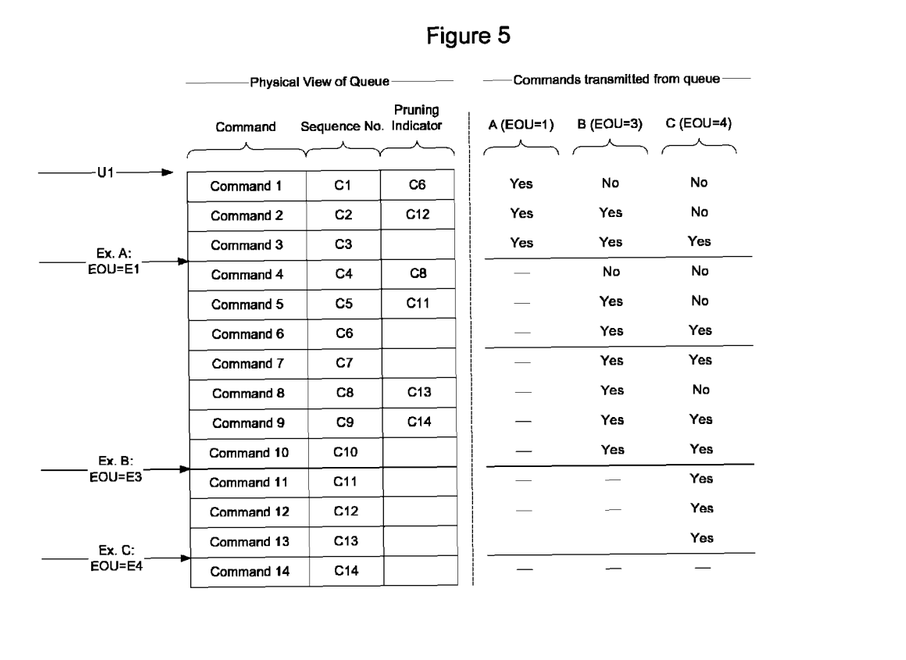
FIG. 5 is a functional block diagram of an update queue illustrating the example shown in FIG. 4, and including both a functional block diagram of the queue itself and a logical view of which commands will be transmitted depending on the selected target end of update marker according to an embodiment of the invention.

FIG. 5 shows an example of a queue that may be used to implement the update queue. The invention is not limited to this particular implementation as other implementations may be used as well. Similarly, FIG. 5 is not intended to show the particular data structures that are used to implement a queue, but rather is intended to show the functional relationship between pieces of data that may be maintained in the queue to enable the RVS software to implement an embodiment of the invention. Many different types of data structures may be used to implement the update queue and the invention is not limited to any one particular implementation.

The example shown in FIG. 5 shows the update queue containing commands C1-C14, which are the same as the commands shown on the timeline of FIG. 4. Thus, commands C1-C3 are associated with update 1, commands C4-C6 are associated with update 2, C7-C10 are associated with update 3, C11-C13 are associated with update 4, and C14 is associated with update 5. The physical view of the queue has the elements arranged in a stack arrangement, with the command adjacent a sequence number so that the commands may be ordered and referenced in the queue. The actual implementation, of course, may take on any convenient queue structure and the invention is not limited by any one particular way in which the queues are actually implemented.

The example shown in FIG. 5 also enables the RVS service to keep track of which commands supersede other commands. For example, command C1 is overwritten by Command C6. When command C6 arrives, the RVS service will determine that it renders Command C1 obsolete, and add a tag to command C1 that it was overwritten by command C6. The tag indicates that the command C1 is not necessary for recreation of the presenter's display for any update that occurs where the target end of update marker has a sequence number that is the same as or higher than the sequence number associated with command C6.

In addition to showing a logical view of the queue, FIG. 5 also shows three examples of which commands will be selected for transmission in a viewer update depending on the target end of update marker selected for the particular viewer update. Specifically, in Example A the target end of update marker is E1, in Example B the target end of update marker is E3, and in Example C the target end of update marker is E4. Each of these examples will be described in greater detail below.

In Example A, the viewer's pointer (arrow U1) is pointed to the beginning of the queue. If the target end of update marker is E1, commands C1-C3 will be transmitted to the viewer. Accordingly, the example shown in the logical View contains a "Yes" indication for Commands C1-C3 indicating that each of these commands will be transmitted to the viewer. The other commands are not applicable to this update since they were received into the queue in connection with subsequent updates and, accordingly, have a sequence number higher than the sequence number of the target end of update marker. Thus, the subsequent commands will not be transmitted to the viewer in connection with this viewer update, and may be transmitted to the viewer in connection with a subsequent viewer update depending on the particular target end of update marker selected for that subsequent viewer update. As the commands are transmitted or skipped, the viewer's pointer U1 is moved relative to the queue to maintain the current position of the viewer in the queue.

In Example B, the viewer's pointer U1 initially is the same as the first example (Example A), but the target end of update marker in this instance is assumed to be selected to be E3. Thus, commands C1-C10 may potentially be transmitted to the viewer. Commands C11-C14 were received in connection with later updates and thus are not candidate commands for transmission to the viewer for a target end of update marker=E3. As shown in FIG. 5, Command C1 was replaced by a subsequent command C6, and Command C4 was replaced by a subsequent command C8. Thus, these two commands are deemed prunable for a viewer update with a target end of update marker=E3, and need not be transmitted to the viewer if the target end of update marker is E3. Accordingly, the list of frames that will be transmitted in example B contains an entry "No" for commands C1 and C4, and an entry "Yes" for the remaining commands C2-C3, and C5-C10.

Example C is similar to example B, except that the target end of update marker is selected to be E4. In this instance, only those commands in update 4 and the commands in updates 1, 2, and 3 that have not been indicated to be prunable in connection with an update for a target end of update marker=E4 need to be transmitted. Accordingly, in this example, commands C3, C6, C7, and C9-C13 will be transmitted in connection with a viewer update having a target end of update marker=E4.

The Examples were provided to show how commands may be selected for transmission to one viewer. Where there are multiple viewers, the remote viewing service may maintain one pointer (U1, U2, . . . Un) for each viewer, thus enabling each viewer to be provided with an appropriate set of commands in connection with an update. As each viewer submits a request to be updated, the remote viewing service will determine the location of the viewer in the queue by looking at the location of the viewer's pointer, selecting a target end of update marker, filtering out those commands that are deemed to be prunable relative to the target end of update marker, and transmitting the commands that are not prunable to the requesting viewer.

Figure 6:
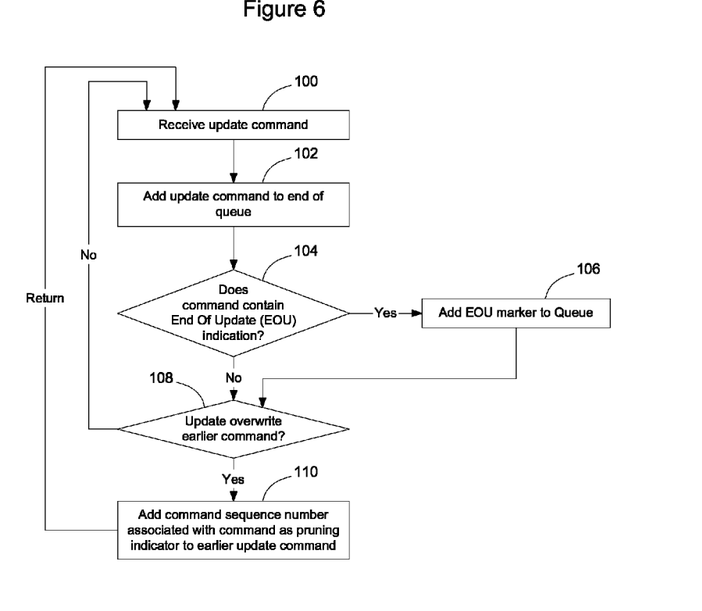
FIG. 6 is a flow chart illustrating a process of adding commands to a queue according to an embodiment of the invention.

FIG. 6 shows a flowchart of a process that may be used to add updates to the queue 34. As shown in FIG. 6, when the remote viewing service 32 receives an update command (100) the update command is added to the end of the queue (102). The update commands may contain a sequence number when they arrive at the remote viewing service 32 or the update commands may be given a sequence number when placed into the queue by the remote viewing service 32. If the update command contains an end of update indication (104), a new end of update marker may be added to the queue (106).

The remote viewing service 32 will also check to determine whether the new command supersedes an earlier command (108). Additional details associated with one way in which this checking process may be implemented using panes is disclosed in the parent application, the content of which is hereby incorporated herein by reference. The invention is not limited to the use of this particular checking process, however, as many different ways of determining whether a new command supersedes an old command may be utilized. If the new command does not supersede any earlier command the process will return. Otherwise, the sequence number associated with the command will be added as a pruning indicator to the earlier update command (110). As described in greater detail herein, the pruning indicator enables the pruning process to selectively not transmit commands where the target end of update marker has a sequence number that is higher than or equal to the command sequence number in the pruning indicator for that command. Although a command has been indicated to be prunable, the command may remain in the queue until it is no longer necessary or potentially necessary to any viewer.

Figure 7:
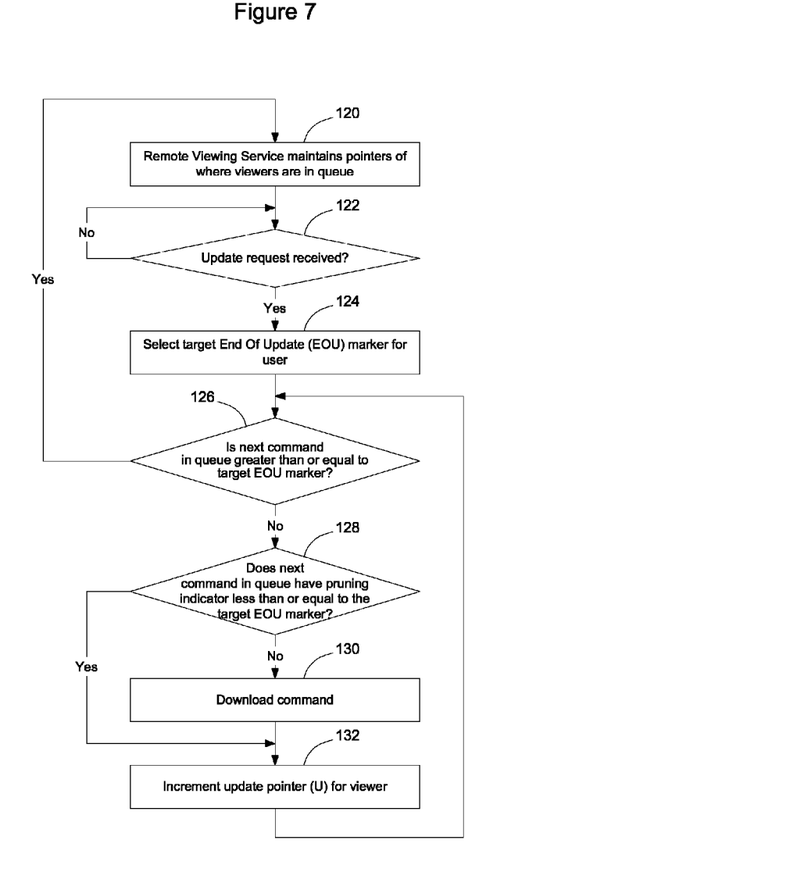
FIG. 7 is a flow chart illustrating a process of transmitting commands from the queue according to an embodiment of the invention.

FIG. 7 shows a process that may be used to select commands for transmission to a remote viewer from the update queue 34. As shown in FIG. 6, the remote viewing service will maintain pointers indicative of where the viewers are in the queue. These pointers indicate that all commands up to that point in the queue have been transmitted to the viewer associated with the pointer. When a viewer is ready to receive additional commands from the update queue, it will transmit a message requesting an update, or otherwise communicate this status to the update queue (122).

Upon receipt of an update request, the remote viewing service will select a target end of update marker for the viewer (124). The manner in which the target end of update marker is selected may be adjustable depending on the manner in which the viewer, presenter, and/or remote viewing service want the presentation on the viewer's machine to appear. For example, the viewer may wish to receive each and every change that is communicated by the presenter to the remote viewing service so that the viewer is able to see each individual screen update. In this instance, the RVS service could be set to always select the next end of update marker in the queue for the viewer, so that no pruning occurs. Alternatively, the viewer may wish to receive most of the updates, in which case the RVS software may be configured to skip at most one end of update marker when selecting a target end of update marker for a viewer. This would allow moderate pruning to occur while allowing the viewer to receive every other screen update from the presenter. Still alternatively the viewer may wish to have their screen updated to be as close as possible to being synchronized with the presenter's display. In this instance the RVS software may select the target end of update marker to be as close to the end of the queue as possible whenever the viewer requests an update. The manner in which the target end of update marker is selected may be controlled by the viewer, presenter, or remote viewing service, to adjust the manner in which the viewer receives updates from the update queue.

Since viewer update requests may occur at any time, it is possible for a viewer to request a viewer update while the remote viewing service is in the process of receiving a presenter update. In this scenario, the target end of update marker may be selected as the end of update marker associated with the current presenter update which has not yet been received in the queue. Thus, the target end of update marker may be selected as the next one that arrives.

Selection of the target end of update marker does not need to be the same for all viewers, and does not need to be constant for a particular viewer. Since the selection of the target end of update marker may be controlled for each viewer, the manner in which updates are generated may be controlled for each viewer and tailored to the particular capabilities and preferences of the viewer. For example, where a viewer is connected via a lower bandwidth connection, the target end of update marker may be selected to be close to the head end of the queue (where new update commands received from the presenter are stored) to maximize pruning Different policy implementations associated with the manner in which the target end of update marker is selected may be developed to optimize different types of viewing experiences that may be provided to the end viewer.

Once the target end of update marker has been selected, the remote viewing service will start at the pointer for that viewer and download all commands up to the end of the target end of update marker that are not indicated to be prunable relative to that point in the queue (126). Specifically, as discussed above, the pruning indicator may be implemented to include the sequence number of the command that renders it obsolete. If the sequence number contained in the pruning indicator is less than or equal to the sequence number of the target end of update marker, the command will be replaced by another command in the queue in connection with generation of this update for the viewer, and hence is considered prunable for this update. By marking the commands as prunable relative to later commands, different commands will be pruned depending on the selected target end of update marker, which allows each viewer to receive a display showing the presenter's display at a particular point in time regardless of how that point in time is determined. The viewer's pointer will be updated as commands are transmitted such that the viewer's pointer will be moved to coincide with the target end of update marker upon completion of transmission of the update to the viewer (128).

Over time, the queue may become quite long, which consumes memory resources at the remote viewing service. Thus, it may be advantageous to delete commands from the queue once all of the viewer's pointers have moved a particular distance away from the commands. For example, if all viewers have passed a particular end of update marker, commands from earlier updates that have been marked as prunable because of subsequent commands received in connection with other updates may be deleted from the queue. By only deleting the commands that are prunable and retaining the other commands, it will be possible to reconstruct an entire frame for a new viewer or for a viewer that loses a connection. If a viewer loses a connection, or a new viewer joins, the viewer will need to be provided with a viewer update to obtain a version of the presenter's display information. Since commands that are prunable may be ultimately deleted from the queue, the target end of update marker for the first viewer update is preferably selected to be the most recent end of update marker so that the viewer is more likely to receive a complete set of commands to paint an entire screen.

In the previous description it was assumed that the commands were all treated alike in the update queue. The service may have special pruning rules for administrative commands and for other types of commands. For example, the update queue may contain an administrative message such as "end of update", or may contain guest information messages. Not all of these messages may be important to the viewer and, hence, not all of these messages need to be transmitted to the viewer. Although not necessarily required to be transmitted to any viewer, the administrative messages may be marked as prunable relative to each other so that they may be selectively purged from the queue at a later point in time or selectively used in connection with generating updates for viewers. Subsequent end of update messages may thus cause other end-of-update messages to be marked as prunable. Similar handling of pointer messages may be implemented and the invention is not limited to a system that treats all messages similarly.

Once a viewer update has been sent, the server will wait for the viewer to acknowledge receipt of the update before sending a new update to the viewer. Automatically continuing to send updates after the end of the first update has been reached may cause messages to become buffered in the communication layer, thus countering the effectiveness of the pruning process described herein.

There are situations where, depending on how the updates are generated, the process of determining which commands are necessary and which are not necessary may become computationally excessive. For example, where the presenter display exhibits a very large amount of movement, for example in connection with a screen saver on the presenter display, the number of panes used to keep track of which commands are necessary and/or which are not necessary may become increasingly large and, hence, difficult to work with. In this instance, the presenter may be requested to provide an update including only paint commands (rather than copy commands) that completely describe the presenter display at a particular point in time or which completely describe a portion of the presenter display at that point in time. Since paint commands describe the screen as it appears, only a single pane is generally required to refer to that area of the screen. Thus, generating a complete view of the presenter's display using paint commands allows the previous panes to be deleted and a new set of panes to be utilized. This allows for the queue to be reset so that subsequent processing may be performed in a less computationally intensive manner.

Upon receiving the new set of paint commands all previous commands in the queue (other than some administrative commands such as pointer commands) may be marked as prunable relative to the new commands. Optionally, when this occurs, the viewer pointers (U1-Un) may be moved to the start of the new set of paint commands and the remaining commands in the queue may be deleted.

The methods described herein may be implemented as software configured to be executed in the control logic such as contained in a CPU of an electronic device such as a computer. In particular, the RVS software or portions of the RVS software may be implemented as a set of program instructions that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

The update queue in this instance may be implemented using any convenient memory structure, such as a FIFO register containing pointers to memory locations in shared memory containing the commands. As updates are received, the commands from the update may be stored in the shared memory and pointers referencing the command may be added to the queue. As commands are deemed to be prunable relative to later commands, the pointers may be marked as such or a separate prunability queue may be maintained. As commands are ultimately deleted from the FIFO, the memory locations associated with the pointers may be released back into the free memory pool. Many different memory structures may be used to implement the update queue and the invention is not limited to the particular technique chosen to implement the update queue.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of facilitating a remote viewing session over which presenter display information is exchanged between a presenter and at least one viewer, the method comprising the steps of:
    receiving a plurality of presenter updates, each presenter update containing one or more commands containing information related to changes to the presenter display information between subsequent points in time, each of the presenter updates further being associated with an end-of-update marker;
    storing the commands from the plurality of presenter updates in an update queue;
    as each presenter update is received, calculating whether any of the commands of the received presenter update render one or a subset of the commands stored in the update queue obsolete, and marking the one or the subset of the commands as prunable relative to the received command or the end-of-update marker associated with the received presenter update;
    maintaining a position of each viewer in the update queue indicating which commands in the queue have been transmitted to the viewer and which commands have not been transmitted to the viewer such that those commands that have not been transmitted to the viewer are maintained in the update queue ahead of the position of the viewer in the update queue;
    selecting one of the end-of-update markers as a target end-of-update marker for a first viewer update to be transmitted to the first viewer;
    determining whether any commands in the queue between the position of the first viewer and the target end-of-update marker are marked as prunable relative to the target end of update marker or relative to another command stored in the queue between the position of the first viewer and the target end-of-update marker;
    including all commands from the queue in the viewer update between the position of the first viewer and the target end-of-update marker that are not marked as prunable relative to the target end of update marker or relative to another command stored in the queue between the position of the first viewer and the target end-of-update marker, and not including commands in the viewer update that are marked as prunable relative to the target end of update marker or relative to another command stored in the queue between the position of the first viewer and the target end-of-update marker.

2. The method of claim 1, wherein each of the commands has a command sequence number, and wherein the first command is marked in the queue as prunable by adding a prunability indicator to the first command, the prunability indicator containing the command sequence number of the second command so that the first command references the command sequence number of the second command.

3. The method of claim 1, further comprising the step of storing the end of update markers in the update queue.

4. A method of selecting updates from a queue of commands for transmission to a viewer, the method comprising the steps of:
    maintaining a queue of commands, at least some of the commands containing prunability indicators, each prunability indicator identifying a corresponding command in the queue that renders a command associated with the prunability indicator obsolete;
    choosing a target end of update marker for a viewer update for a viewer, the viewer being associated with a current location pointer indicating a current position of the viewer in the queue; and
    selecting a subset of commands from the queue to not be transmitted to the viewer between the current location pointer for the viewer and the target end of update marker by determining which commands in the queue between the current location pointer of the viewer and the target end of update marker for the viewer have prunability indicators identifying corresponding subsequent commands in the queue between the current location pointer of the viewer and the target end of update marker; and
    transmitting all commands between the current location of the viewer and the target end of update marker except the selected subset of commands to the viewer as the viewer update so that the selected subset of commands is not transmitted to the viewer in connection with the viewer update.

5. The method of claim 4, wherein each command in the queue has a sequential command sequence number, wherein each target end of update marker is assigned one of the command sequence numbers, and wherein the prunability indicators contained by the commands are the command sequence numbers of the later commands which render the commands associated with the prunability indicators obsolete.

6. The method of claim 5, wherein the step of selecting commands for transmission comprises automatically selecting a command for transmission if the command does not contain a prunability indicator.

7. The method of claim 5, wherein the step of selecting commands for transmission comprises determining, when a command contains a prunability indicator, whether the command sequence number of the later command has a higher sequence number than the command sequence number of the target end of update marker.

8. The method of claim 7, wherein the step of selecting commands for transmission comprises selecting not selecting a command for transmission if its prunability indicator has a lower command sequence number than the command sequence number of the target end of update marker and selecting a command for transmission if it has no prunability indicator or if its prunability indicator has a higher command sequence number than the command sequence number of the target end of update marker.

9. The method of claim 1, wherein the step of choosing a target end of update marker comprises choosing a target end of update marker that is other than a next subsequent end of update marker in the queue.

10. A method of transmitting information at different rates to different viewers from a queue of update commands, each of the commands having a sequence number and at least some of the commands referencing sequence numbers of later commands in the queue, the method comprising the steps of:
   maintaining pointers for the viewers, each pointer identifying a position of the viewer in the queue;
   selecting a first target end of update for a first viewer, the first target end of update having a first sequence number;
   transmitting commands to the first viewer that are contained in the queue between the pointer for the first viewer and the first target end of update that do not reference sequence numbers of other commands in the queue or that reference sequence numbers of other commands that are contained in the queue after the first target end of update, and not transmitting commands to the first viewer that are contained in the queue between the pointer for the first viewer and the first target end of update that do reference sequence numbers of other commands in the queue which are stored in the queue between the pointer for the first viewer and the first target end of update.

11. The method of claim 10, further comprising the steps of:
   selecting a second target end of update for a second viewer, the second target end of update having a second sequence number, the second target end of update being different than the first target end of update;
   transmitting commands to the second viewer that are contained in the queue between the pointer for the second viewer and the second target end of update that do not reference sequence numbers of a later command in the queue or that reference sequence numbers of later commands that are contained in the queue after the second target end of update, and not transmitting commands to the second viewer that are contained in the queue between the pointer for the second viewer and the second target end of update that do reference sequence numbers of a later command in the queue between the pointer for the second viewer and the second target end of update.

12. The method of claim 10, wherein the step of transmitting commands comprises determining, for each command, whether the prunability indicator for that command contains a sequence number that is higher than a sequence number of the first target end of update.

13. A storage queue implemented in an electronic storage medium, the storage queue comprising:
   a plurality of commands, at least some of which have not yet been transmitted to at least one viewer and are queued to be transmitted to the at least one viewer, at least some of the commands that have not yet been transmitted to the at least one viewer containing a-prunability indicators identifying particular subsequent commands in the queue which render the earlier commands obsolete.

14. The storage queue of claim 13, wherein the commands contain display update information associated with changes to a presenter screen during a time interval, and wherein the storage queue further contains an end of update marker separating commands stored within the queue that are associated with the time interval and commands stored within the queue that are outside of the time interval.

15. The storage queue of claim 14, wherein selection of a group of commands from an earlier point in the queue to an end of update marker will allow the at least one viewer to obtain a snapshot of the presenter's screen at the time associated with the end of the time interval.

* * * * *